United States Patent
Modzelewski et al.

[11] Patent Number: 6,145,874
[45] Date of Patent: Nov. 14, 2000

[54] PASSENGER AIR BAG DISABLE SWITCH

[75] Inventors: Thomas Modzelewski, Brighton; Jeffrey W. Stahlbaum, Metamora, both of Mich.

[73] Assignee: TRW Inc., Lyndhurst, Ohio

[21] Appl. No.: 08/960,381

[22] Filed: Oct. 29, 1997

[51] Int. Cl.[7] ................................................. B60R 21/32
[52] U.S. Cl. ...................... 280/735; 250/222.1; 70/278.2
[58] Field of Search ........................... 280/735; 180/282; 307/10.1; 70/DIG. 51, 278.1, 278.2; 250/222.1

[56] References Cited

U.S. PATENT DOCUMENTS

| | | | |
|---|---|---|---|
| 3,733,862 | 5/1973 | Killmeyer | 70/DIG. 51 |
| 5,428,340 | 6/1995 | Kawabata et al. | |
| 5,468,014 | 11/1995 | Gimbel et al. | |
| 5,544,914 | 8/1996 | Borninski et al. | |

*Primary Examiner*—Paul N. Dickson
*Attorney, Agent, or Firm*—Tarolli, Sundheim, Covell, Tummino & Szabo L.L.P.

[57] ABSTRACT

A vehicle occupant safety apparatus includes an air bag (12) and an actuatable inflator (14). The apparatus includes vehicle electric circuitry (18) having a first condition enabling actuation of the inflator (14) and a second condition disabling actuation of the inflator. A disable switch (10) includes an optical transmitter (90) for providing a signal in the form of a light beam (92) and an optical receiver (100) for receiving the light beam from the transmitter. Movement of a key (66) into a position between the optical transmitter (90) and the optical receiver (100) prevents at least a part of the light beam (92) from being directed to the optical receiver, thus modifying the signal. The vehicle electric circuitry (18) changes between the first condition and the second condition in response to the modification of the signal.

12 Claims, 2 Drawing Sheets

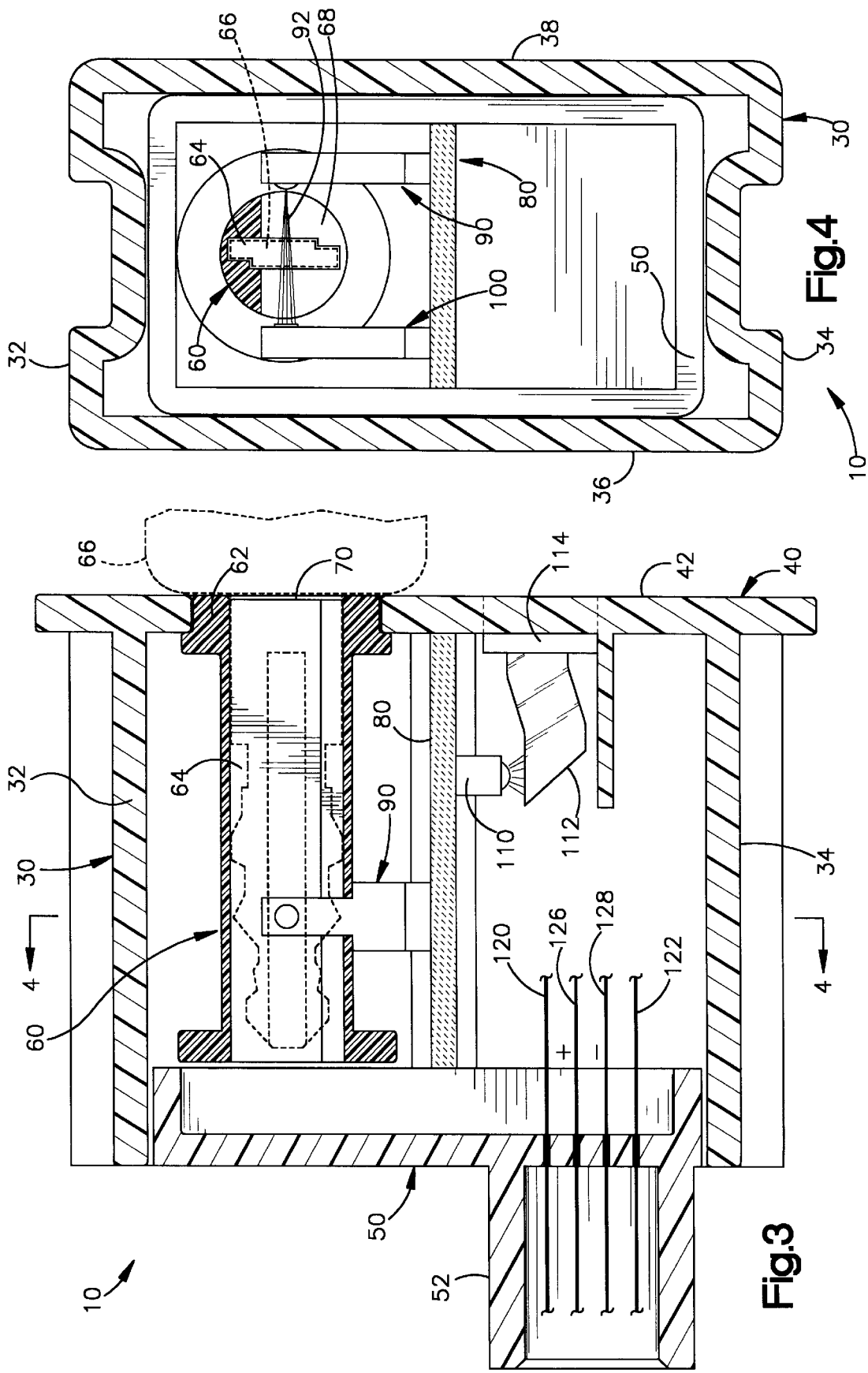

PASSENGER AIR BAG DISABLE SWITCH

BACKGROUN OF THE INVENTION

1. Technical Field

The present invention relates to an apparatus for selectively disabling an inflatable vehicle occupant protection device, such as an air bag.

2. Description of the Prior Art

It is known to inflate an air bag to help protect a front seat passenger of a vehicle in the event of a vehicle collision. The air bag is stored in a deflated condition, together with an inflator, in the instrument panel of the vehicle. In the event of a vehicle collision, the inflator is actuated, and the air bag is inflated into a position between the vehicle occupant in the vehicle seat and the instrument panel of the vehicle.

It is sometimes desirable that a passenger side air bag not be inflated in the event of a vehicle collision, for example, if a rearward facing child seat is disposed on the vehicle seat. It is known to provide a rotatable lock cylinder on the instrument panel of the vehicle, into which the vehicle ignition key can be inserted and turned in order to disable a passenger side air bag.

SUMMARY OF THE INVENTION

The present invention is a vehicle occupant safety apparatus comprising an inflatable vehicle occupant protection device and an inflator actuatable to inflate the inflatable device in response to sensing a condition indicative of a vehicle collision. The apparatus includes vehicle electric circuitry having a first condition enabling actuation of the inflator and a second condition disabling actuation of the inflator. The apparatus includes a transmitter for providing a signal and a receiver for receiving the signal from the transmitter. The apparatus also includes means for enabling movement of a key into a position between the transmitter and the receiver to modify the signal. The apparatus further includes means for changing the vehicle electric circuitry between the first condition and the second condition in response to the modification of the signal.

In a preferred embodiment, the transmitter is an optical transmitter, the receiver is an optical receiver, and the signal is a light beam. Movement of a key into a position between the optical transmitter and the optical receiver prevents at least a part of the light beam from being directed to the optical receiver.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a sectional view of the disable switch of FIG. 1; and

FIG. 4 is a sectional view taken along line 4—4 of FIG. 3.

DESCRIPTION OF A PREFERRED EMBODIMENT

Figure 1:
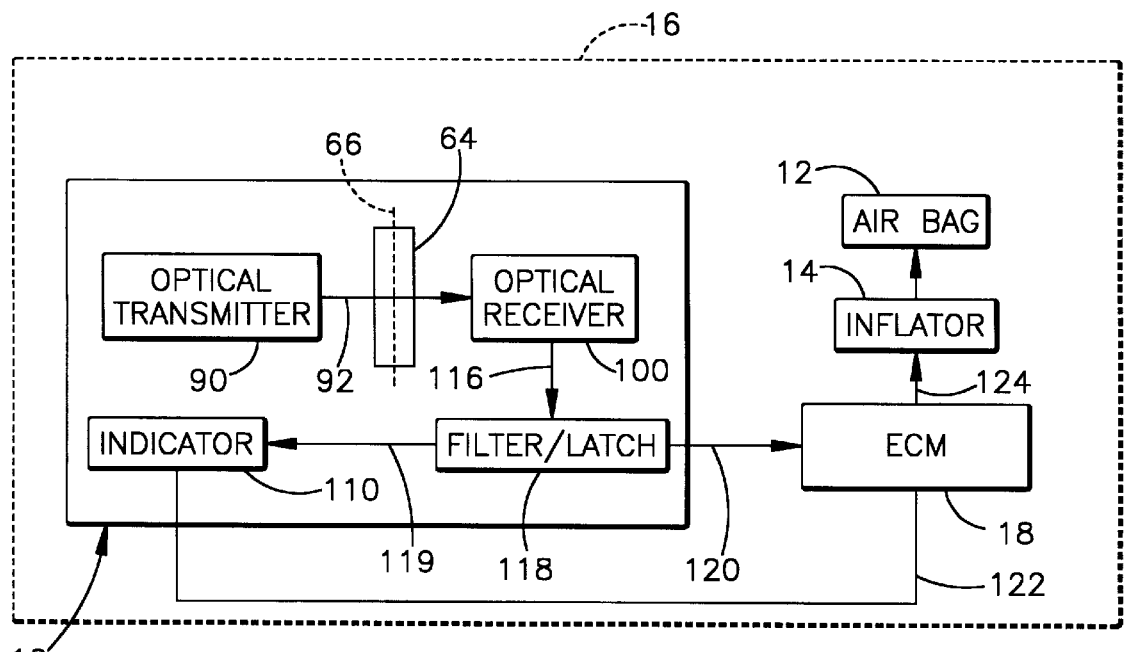
FIG. 1 is a schematic block diagram of a vehicle safety apparatus including an air bag disable switch constructed in accordance with the present invention.
Figure 2:
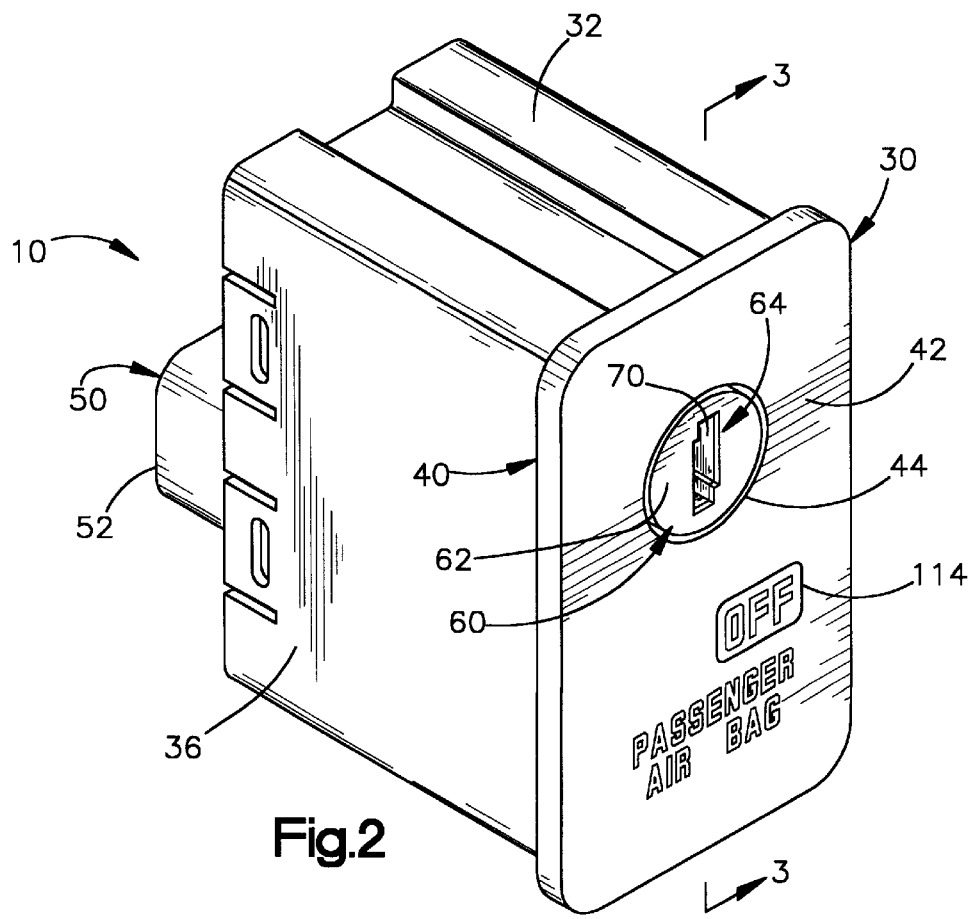
FIG. 2 is a perspective view of the disable switch of FIG. 1.

The present invention relates to an apparatus for selectively disabling an inflatable vehicle occupant protection device, such as an air bag. As representative of the present invention, FIGS. 1–4 illustrate a disable switch 10 for selectively disabling a passenger side air bag indicated schematically at 12 (FIG. 1).

The air bag 12 is mounted together with an electrically actuatable inflator 14 in an instrument panel 16 of the vehicle. Actuation of the inflator 14 is controlled by an electronic control module ("ECM") 18. The vehicle also includes known sensor means (not shown) for sensing a condition indicative of a vehicle collision involving the vehicle and for causing the ECM 18 to actuate the inflator 14 in response. The air bag 12 inflates into a position between the occupant of the front passenger seat of the vehicle and the instrument panel 16 of the vehicle.

The ECM 18 includes vehicle electric circuitry having a first condition enabling actuation of the inflator 14 and a second condition disabling actuation of the inflator. The disable switch 10 is actuatable in a manner described below to selectively disable actuation of the inflator 14. The disable switch 10 is mounted on the instrument panel 16 of the vehicle so that the disable switch is manually actuatable by an occupant of the vehicle.

The disable switch 10 includes a bezel 30 (FIGS. 2–4) molded as one piece from a plastic material. The bezel 30 has a rectangular, box-shaped configuration including upper and lower walls 32 and 34 joined by side walls 36 and 38. The bezel 30 has a front wall 40 with an outer surface 42 which is exposed to the passenger compartment of the vehicle when the disable switch 10 is installed in the instrument panel 16 of the vehicle. A circular opening 44 is formed in the front wall 40 of the bezel 30.

A base 50 is secured in the back of the bezel 30 in a manner not shown. The base 50 includes a projecting portion 52 for receiving an electrical connector (not shown).

The disable switch 10 includes a key block 60. The key block 60 is molded from a plastic material and has an elongate, solid cylindrical configuration. An outer end portion 62 of the key block is secured in the front wall 40 of the bezel 30.

A slot or keyway 64 extends along the length of the key block 60. The keyway 64 has an outer opening 70 which is aligned with the exposed front surface 42 of the bezel 30. The keyway 64 is adapted to receive, through the opening 70, a manually movable member in the form of an ignition key 66 of the vehicle. Specifically, the keyway 64 has a cross-sectional configuration identical to the cross-sectional configuration of the ignition key 66 of the vehicle in which the disable switch 10 is installed. Alternatively, the keyway 64 may have a cross-sectional configuration adapted to receive any ignition key made by the manufacturer of the vehicle in which the disable switch 10 is installed.

At a selected location along the length of the key block 60, a light passage 68 is formed in the key block. The light passage 68 extends transverse to the keyway 64 so that a light beam can shine across the keyway.

The disable switch 10 includes a printed circuit board or PC board 80 which extends parallel to the key block 60 at a location below the key block. A light source or "optical transmitter" 90 is mounted on the PC board 80. The optical transmitter 90 extends upward from the PC board 80, along one side of the key block 60. The optical transmitter 90 is a known device, such as an LED, for transmitting a signal in the form of a light beam 92 across the keyway 64.

The optical transmitter 90 is fixed in place relative to the keyway 64, at the vertical centerline of the keyway. The optical transmitter 90 is located at the transverse passage 68 in the key block 60. Thus, the light beam 92 from the optical transmitter 90 extends through the transverse passage 68 in the key block 60 and across the keyway 64.

An "optical receiver" 100 is also mounted on the PC board 80. The optical receiver 100 is a known device, such as a phototransistor, for receiving the light beam 92 from the optical transmitter 90 and for providing an output signal having different states dependent upon whether the light beam is received. The optical receiver 100 is mounted on the PC board 80 with its optical axis aligned coaxially with the optical transmitter 90. The optical receiver 100 is therefore positioned so that the light beam 92 from the optical transmitter 90, when it passes through the keyway 64, is received by the optical receiver. The disable switch 10 is light-tight so that only light from the optical transmitter 90 impinges on the optical receiver 100.

An indicator light source 110 is mounted on the underside of the PC board 80. The indicator light source 110 is a known device, such as an LED, for transmitting a light beam into a light pipe 112. The light pipe 112 transmits the light beam from the indicator light source 110 to an indicator lens 114 on the outer surface 42 of the front wall 40 of the bezel 30. The indicator lens 114 displays the word "OFF" when lit by the indicator light source 110.

The output of the optical receiver 100 is directed over a lead wire 116 to a low pass filter and latch circuit 118 to filter out any transients or noise in the signal from the optical receiver 100. The output of the optical receiver 100 sets or resets the latch circuit 118. The latch circuit 118 controls the state of the indicator 110 by a signal over a lead wire 119. The latch circuit 118 maintains its set condition until the state of the output of the optical receiver changes due to key insertion in the keyway 64. The condition of the latch circuit 118 is maintained even when the vehicle ignition is turned off.

A portion of the vehicle electric circuitry, indicated schematically by a lead wire 120, extends between the latch circuit 118 and the ECM 18. The lead wire 120 electrically connects the output of the latch circuit 118 with the ECM 18. The lead wire 120 enables the on/off condition, or state, of the latch circuit 118 to be monitored by the ECM 18 for logic transitions.

Another portion of the vehicle electric circuitry, indicated schematically by a lead wire 122, enables the ECM 18 to confirm the state of actuation of the inflator 14 after ignition startup and to set the on/off condition of the indicator 110 accordingly. Another portion of the vehicle electric circuitry, indicated schematically by a lead wire 124 (FIG. 1), extends between, and electrically connects, the ECM 18 and the inflator 14.

Electric current is supplied to the disable switch 10 by lead wires indicated schematically at 126 and 128 (FIG. 3). A suitable electric connector (not shown) is received in the base 50 for interconnecting the lead wires 120, 122, 126 and 128 with the PC board 80.

The optical transmitter 90 draws very little current. Therefore, power can, if so desired, be supplied continuously to the optical transmitter 90, even when the vehicle ignition is turned off. Alternatively, power can be supplied to the optical transmitter 90 through vehicle electric circuitry which is activated in response to an event such as the opening of a door of the vehicle, the actuation of a remote keyless entry receiver of the vehicle, or the actuation of a seat switch of the vehicle. Suitable vehicle electric circuitry of this type is disclosed in pending U.S. patent application Ser. No. 08/892,876, filed Jul. 15, 1997, by Peter A. Fulda, entitled TIMING CIRCUIT FOR AIR BAG DISABLE SWITCH, owned by the assignee of this application.

The state of the inflator 14 (enabled or disabled) can be changed in the following manner. The keyway 64 of the disable switch 10 enables movement of the vehicle ignition key 66 into a position between the optical transmitter 90 and the optical receiver 100 to modify the light beam 92. Specifically, movement of the vehicle ignition key 66 into a position between the optical transmitter 90 and the optical receiver 100 prevents at least a part of the light beam 92 from being directed to the optical receiver.

When the key 66 is not disposed in the keyway 64 and is not blocking the light beam 92, the light beam 86 from the optical transmitter 90 passes through the keyway. The light beam 92 is received by the optical receiver 100. The optical receiver 100 outputs an output signal to the filter/latch circuit 118 which has a first state (e.g., a "low" or logic "0" level).

When the key 66 is, subsequently, inserted into the keyway 64, the light beam 92 is partially or fully obscured by the key. Since the light beam 92 is at least partially interrupted by the key 66, the amount of light reaching the optical receiver 100 is diminished. The output signal from the optical receiver 100 to the filter/latch circuit 118 assumes a second state (e.g., a "high" or logic "1" state).

When the key 66 is then removed from the keyway 64, the light beam 92 is no longer obscured by the key. The amount of light reaching the optical receiver 100 returns to its original level. The output signal from the optical receiver 100 to the filter/latch circuit 118 assumes the first state.

The filter latch circuit 118 changes the on/off condition of the indicator 110 and the logic state of the latch. The ECM 18 is informed of the logic state of the latch. The ECM 18 changes the state of actuation of the inflator 14 by changing the vehicle electric circuitry between the first condition and the second condition.

In response to the next subsequent instance of the modification of the light beam 92, the vehicle electric circuitry again changes between the second condition and the first condition. For example, when the vehicle electric circuitry is in the second condition and the key 66 is inserted into and removed from the keyway 64 in the switch 10, the ECM 18 is informed of the new logic state of the latch. The ECM 18 reacts by changing the vehicle electric circuitry from the second condition to the first condition. As a result, the state of actuation of the inflator 14 is changed.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus for a vehicle having a rotatable ignition, said apparatus comprising:

an inflatable vehicle occupant protection device;

an inflator actuatable to inflate said inflatable device in response to sensing a condition indicative of a vehicle collision;

vehicle electric circuitry having a first condition enabling actuation of said inflator and a second condition disabling actuation of said inflator;

a transmitter for providing a signal;

a receiver for receiving said signal from said transmitter;

a vehicle ignition key for rotating the ignition, said ignition key being movable in a non-rotatable key block only linearly between said transmitter and said receiver to modify said signal; and means for changing said vehicle electric circuitry between the first condition and the second condition in response to the modification of said signal by the vehicle ignition key.

2. A vehicle occupant safety apparatus as set forth in claim 1 wherein said transmitter is an optical transmitter, said receiver is an optical receiver, and said signal is a light beam.

3. A vehicle occupant safety apparatus as set forth in claim 2 wherein said means for enabling comprises means for enabling movement of a key into a position between said optical transmitter and said optical receiver to prevent at least a part of said light beam from being directed to said optical receiver.

4. A vehicle occupant safety apparatus as set forth in claim 1 wherein said means for enabling comprises the key block defining a keyway, said keyway having a cross-sectional configuration identical to the cross-sectional configuration of the ignition key of the vehicle in which said vehicle occupant safety apparatus is installed.

5. A vehicle occupant safety apparatus as set forth in claim 1 wherein said means for enabling comprises a molded plastic member defining a keyway for receiving the key, said member further defining a passage extending transverse to said keyway for enabling passage of said signal from said transmitter to said receiver.

6. A vehicle occupant safety apparatus as set forth in claim 5 wherein said transmitter is an optical transmitter, said receiver is an optical receiver, and said signal is a light beam.

7. A vehicle occupant safety apparatus as set forth in claim 6 wherein said keyway enables movement of the key into a position between said optical transmitter and said optical receiver to prevent at least a part of said light beam from being directed to said optical receiver.

8. A vehicle occupant safety apparatus as set forth in claim 1 wherein said vehicle electric circuitry changes from the first condition to the second condition in response to a first instance of the modification of said signal, said vehicle electric circuitry changing from the second condition to the first condition in response to a next subsequent instance of the modification of said signal.

9. A vehicle occupant safety apparatus for a vehicle having a rotatable ignition, said apparatus comprising:

an inflatable vehicle occupant protection device;

an inflator actuatable to inflate said inflatable device in response to sensing a condition indicative of a vehicle collision;

an optical transmitter for providing a light beam extending in a first direction;

an optical receiver for receiving said light beam from said optical transmitter; and a vehicle ignition key for rotating the ignition, said ignition key being movable only linearly into a position between said transmitter and said receiver to block said light beam, said ignition key having a solid shaft; and vehicle electric circuitry having a first condition enabling actuation of said inflator and a second condition disabling actuation of said inflator;

said vehicle electric circuitry changing between the first condition and the second condition in response to the prevention of at least a part of said light beam from being directed to said optical receiver by the linear insertion and immediate removal of said vehicle ignition key between said transmitter and said receiver.

10. A vehicle occupant safety apparatus as set forth in claim 1 comprising means for directing movement of a manually movable member into the path of said light beam.

11. A vehicle occupant safety apparatus as set forth in claim 10 wherein said means for directing movement comprises a key receiving member having a keyway extending across the path of said light beam, said keyway having an opening for receiving a vehicle ignition key into said keyway.

12. A vehicle occupant safety apparatus as set forth in claim 10 wherein said vehicle electric circuitry changes from the first condition to the second condition in response to a first instance of the prevention of at least a part of said light beam from being directed to said optical receiver, said vehicle electric circuitry changing from the second condition to the first condition in response to a next subsequent instance of the prevention of at least a part of said light beam from being directed to said optical receiver.

* * * * *

UNITED STATES PATENT AND TRADEMARK OFFICE
CERTIFICATE OF CORRECTION

PATENT NO. : 6,145,874
DATED : November 14, 2000
INVENTOR(S) : Thomas Modzelewski, Jeffery W. Stahlbaum It is certified that error appears in the above-indentified patent and that said Letters Patent is hereby corrected as shown below:

Column 6, line 25, change "1" to "9"

Column 6, line 28, change "10" to "9"

Column 6, line 34, change "10" to "9"

Signed and Sealed this

Twenty-ninth Day of May, 2001

Attest:

NICHOLAS P. GODICI

*Attesting Officer*  *Acting Director of the United States Patent and Trademark Office*